United States Patent
Rossbach et al.

(10) Patent No.: US 12,273,882 B2
(45) Date of Patent: Apr. 8, 2025

(54) FAST RESOURCE ALLOCATION ADJUSTMENT AND MEDIA ACCESS CONTROL AWARENESS OF QUALITY OF SERVICE FLOWS IN WIRELESS COMMUNICATIONS

(71) Applicant: Apple Inc., Cupertino, CA (US)

(72) Inventors: Ralf Rossbach, Munich (DE); Fangli Xu, Beijing (CN); Sarma V. Vangala, Campbell, CA (US); Haijing Hu, Los Gatos, CA (US); Weidong Yang, San Diego, CA (US); Lakshmi Iyer, Cupertino, CA (US); Sabine Roessel, Munich (DE)

(73) Assignee: Apple Inc., Cupertino, CA (US)

( * ) Notice: Subject to any disclaimer, the term of this patent is extended or adjusted under 35 U.S.C. 154(b) by 475 days.

(21) Appl. No.: 17/438,214

(22) PCT Filed: Jun. 25, 2021

(86) PCT No.: PCT/CN2021/102336
§ 371 (c)(1),
(2) Date: Sep. 10, 2021

(87) PCT Pub. No.: WO2022/266994
PCT Pub. Date: Dec. 29, 2022

(65) Prior Publication Data
US 2022/0417972 A1    Dec. 29, 2022

(51) Int. Cl.
*H04W 72/20*    (2023.01)
(52) U.S. Cl.
CPC .................... *H04W 72/20* (2023.01)
(58) Field of Classification Search
None
See application file for complete search history.

(56) References Cited

U.S. PATENT DOCUMENTS

| 11,805,451 B2 * | 10/2023 | Takeda | H04W 48/08 |
| 2007/0032200 A1 * | 2/2007 | Taneja | H04L 1/0018 |
| | | | 455/70 |

(Continued)

FOREIGN PATENT DOCUMENTS

| CN | 104468060 A | 3/2015 |
| CN | 109996334 A | 7/2019 |

(Continued)

OTHER PUBLICATIONS

Extended European Search Report for EP Patent Application No. 21895915.3; 11 pages; Oct. 7, 2022.

(Continued)

*Primary Examiner* — Otis L Thompson, Jr.
(74) *Attorney, Agent, or Firm* — Kowert, Hood, Munyon, Rankin & Goetzel, P.C.

(57) ABSTRACT

An application layer in a device, a service data adaptation protocol (SDAP) layer in the device, and/or a media access control (MAC) layer in the device may determine that wireless communication resources allocated to the device need to be adjusted. The determination may be in response to detecting that a quality of the wireless connection of the device has deteriorated, or it may be based on advance knowledge of information pertaining to an application layer payload in the device. In response to the determination the device may transmit, in a MAC Control Element (MAC CE) to a base station, a request for an adjustment of the allocated wireless communication resources. The adjustment may lead to a temporary boost of resources for a limited period of time or to a persistent update of the allocated wireless communication resources. To allow better scheduling of multiple QoS flows mapped to the same DRB and better selection of data when constructing a MAC Packet Data (Continued)

Unit (PDU), a mapping between QoS flows and LCHs may also be provided to the MAC layer.

19 Claims, 6 Drawing Sheets

(56) References Cited

U.S. PATENT DOCUMENTS

| | | | |
|---|---|---|---|
| 2007/0249287 A1* | 10/2007 | Das | H04W 28/18 |
| | | | 455/515 |
| 2010/0309788 A1 | 12/2010 | Ho | |
| 2016/0337909 A1* | 11/2016 | Cai | H04W 28/0864 |
| 2019/0150213 A1* | 5/2019 | Kim | H04L 41/08 |
| | | | 370/254 |
| 2019/0261234 A1 | 8/2019 | Park et al. | |
| 2019/0297356 A1* | 9/2019 | Sivaraj | H04L 65/611 |
| 2019/0306801 A1 | 10/2019 | Zhou et al. | |
| 2019/0356438 A1* | 11/2019 | Lee | H04B 7/0695 |
| 2020/0260377 A1* | 8/2020 | Jin | H04W 72/0446 |
| 2020/0296749 A1* | 9/2020 | Freda | H04W 72/20 |
| 2020/0305167 A1* | 9/2020 | Freda | H04W 4/40 |
| 2020/0314681 A1* | 10/2020 | Kuo | H04W 72/23 |
| 2021/0037531 A1* | 2/2021 | Abedini | H04W 72/046 |
| 2021/0337539 A1* | 10/2021 | Lei | H04W 72/23 |
| 2021/0385170 A1* | 12/2021 | Karjee | H04L 47/24 |
| 2022/0095224 A1* | 3/2022 | Kim | H04L 1/0009 |
| 2022/0303182 A1* | 9/2022 | Zhou | H04L 41/0813 |
| 2022/0330096 A1* | 10/2022 | Kim | H04W 72/54 |
| 2023/0283424 A1* | 9/2023 | Rao | H04L 5/0053 |
| | | | 370/329 |

FOREIGN PATENT DOCUMENTS

| | | |
|---|---|---|
| CN | 111865508 A | 10/2020 |
| WO | 2020264166 | 12/2020 |

OTHER PUBLICATIONS

Apple "Scheduling Assistance Information for support of new QoS"; 3GPP TSG RAN WG2 Meeting #113-e R2-2100856; 10 pages; Jan. 25, 2021.

International Search Report and Written Opinion for PCT/CN2021/102336; 9 pages; Mar. 30, 2022.

\* cited by examiner

```
┌─────────────────────────────────────────────────────────────────────┐
│ Make a determination, by an application layer in the device and/or  │
│ by a service data adaptation protocol layer in the device and/or by │
│ a media access control (MAC) layer in the device, that wireless     │
│ communication resources allocated to the device need to be adjusted │
│                              702                                    │
└─────────────────────────────────────────────────────────────────────┘
                                  │
                                  ▼
┌─────────────────────────────────────────────────────────────────────┐
│ Transmit, in a MAC Control Element (MAC CE) to a base station, a    │
│ request for an adjustment by the base station of the allocated      │
│ wireless communication resources                                    │
│                              704                                    │
└─────────────────────────────────────────────────────────────────────┘
```

*FIG. 7*

FAST RESOURCE ALLOCATION ADJUSTMENT AND MEDIA ACCESS CONTROL AWARENESS OF QUALITY OF SERVICE FLOWS IN WIRELESS COMMUNICATIONS

PRIORITY CLAIM INFORMATION

This application is a U.S. National Stage application of International Application No. PCT/CN2021/102336, filed Jun. 25, 2021, titled "Fast Resource Allocation Adjustment and Media Access Control Awareness of Quality of Service Flows in Wireless Communications", which is hereby incorporated by reference in its entirety as though fully and completely set forth herein.

FIELD OF THE INVENTION

The present application relates to wireless communications, including fast resource allocation adjustment and media access control (MAC) awareness of quality of service (QoS) flows during wireless communications, e.g. during 5G-NR communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH™, etc. A current telecommunications standard moving beyond the current International Mobile Telecommunications-Advanced (IMT-Advanced) Standards is called 5th generation mobile networks or 5th generation wireless systems, referred to as 3GPP NR (otherwise known as 5G-NR or NR-5G for 5G New Radio, also simply referred to as NR). NR proposes a higher capacity for a higher density of mobile broadband users, also supporting device-to-device, ultra-reliable, and massive machine communications, as well as lower latency and lower battery consumption, than LTE standards.

One aspect of wireless communication systems, including NR cellular wireless communications, involves Ultra-Reliable Low Latency Communications (URLLC) and eXtended Reality (XR) communications. There are currently no suitable mechanisms for a User Equipment device (UE) to signal its traffic pattern and periodicity related information through the NR Access Stratum (AS) and the UE has to rely on buffer status reports (BSRs) and/or a scheduling request (SR) when using the NR Media Access Control (MAC) layer. Furthermore, the MAC layer cannot currently identify different Quality of Service (QoS) flows within a Logical Channel (LCH), and no clear mapping currently exists between Configured Grants (CGs) and QoS flows/QoS Flow Identifiers (QFIs), which means the MAC layer cannot select the most appropriate data when constructing a MAC Packet Data Unit (PDU) as it cannot identify Service Data Units (SDUs) based on QoS flows or QFIs within the LCH. Improvements in the field are desired.

SUMMARY OF THE INVENTION

Embodiments are presented herein of, inter alia, of methods and procedures for fast adjustment of wireless communication resources and media access control (MAC) awareness of quality of service (QoS) flows in wireless communications. Embodiments are further presented herein for wireless communication systems containing wireless communication devices or user equipment devices (UEs) and/or base stations and access points (APs) communicating with each other within the wireless communication systems.

For URLLC and/or XR services requiring deterministic and/or periodic traffic, a device, e.g. UE, may inform the network of potential updates or an alteration of its traffic patterns over time, so that radio resource allocations to the UE (e.g., configured grants, CGs, and/or semi-persistent scheduling, SPS) may be adjusted. The UE may inform the network, e.g. a base station in the network, via a MAC control element (MAC CE) in response to the application layer in the device and/or the service data adaptation protocol (SDAP) layer in the device and/or the media access control (MAC) layer in the device making a determination that wireless communication resources allocated to the device need to be adjusted. Specifically, the UE may transmit in the MAC CE to the base station, in response to the determination, a request for an adjustment by the base station of the allocated wireless communication resources. The determination may be based on detection, by the application and/or by the SDAP layer and/or by the MAC layer that a quality of the wireless connection of the device within the wireless network has deteriorated, and/or may be based on advance knowledge of information pertaining to an application layer payload in the device. Based on the advance knowledge of information the UE may determine one or more factors that may include burst size, burst size distribution, burst timing, reliability, and/or periodicity, and may transmit the request according to these one or more determined factors. The determination may be based on a detection that the present quality of service (QoS) and/or quality of experience (QoE) requirements for the wireless communications of the UE are not being met. The allocated wireless communication resources may be temporarily adjusted for a limited period of time, or they may be adjusted as a persistent update to the allocated wireless communication resources. The various aspects of the determination and the transmission of the request may be configured internally in the UE, through network configuration, through protocol operation, and/or as part of standardized 3GPP system operation, just to name a few.

The request may include a request for the base station to boost quality of an uplink wireless connection or a downlink connection of the device within a wireless network, a request for a periodicity adjustment, an indication of an update of burst arrival times, an indication of an update of burst timing, an indication of a burst size, an indication of a burst size distribution, and/or an indication of an update of reliability. Additionally, the determination may be specifically in response to the MAC layer detecting that data has remained in the transmission buffer longer than a maximum buffer residency time threshold and/or the MAC layer detecting that the data has remained in the transmission buffer shorter than a minimum buffer residency time threshold. In some embodiments, the determination may lead to the application layer and/or the SDAP layer to request lower layers relative to the requesting layer for a temporary boost of resources, and the device may transmit the MAC CE at least partially in response to the application layer and/or the SDAP layer requesting the temporary boost of resources. The application layer and/or the SDAP layer may request the temporary boost of resources for a predefined period of time.

In some embodiments, the MAC CE may include a request to switch to a next lower configured grant (CG) periodicity, a request to change a grant size of the CG, and/or a detailed request corresponding to a specific parameter set for the CG. Accordingly, the adjustment of the allocated wireless communication resources may include adjustment of XR related parameters, parameters related to fulfillment of the QoS requirements and/or QoE requirements, configured grants, and/or radio resources. The MAC CE may also include logical channel identity information, quality of service flow identifier (QFI) identity information, configured grant (CG) identity information, requested periodicity, requested burst timing, requested burst size, requested burst size distribution, requested reliability, validity indication, and or key performance indicator parameter values. The determination may also be based on buffer jitter, average packet buffer residence time, and/or residence time of service data units in a logical channel buffer.

To enable the MAC layer to select the most appropriate data when constructing a MAC Packet Data Unit (PDU), the MAC layer may maintain a separate QFI per logical channel (LCH) by establishing a mapping between respective QFIs and LCHs. The MAC layer may also associate a given grant with a corresponding QFI. The mapping between the respective QFIs and LCHs may be established by including a respective logical channel prioritization (LCP) mapping restriction for the respective QFI and LCH in a corresponding logical configuration information element. To associate a given grant with a corresponding QFI, a QFI may be included in a configured grant configuration information element. The MAC layer may thereby select data during logical channel prioritization (LCP) based at least in part on traffic characteristics and/or quality QoS flows. The treatment of the traffic characteristics and/or QoS flows may be based on LCP restrictions and/or a QFI. The MAC layer may construct the MAC PDUs based at least in part on the QoS flows, with the QFI associated with a specified priority. In addition, the MAC layer may perform intra-device (intra-UE) prioritization between overlapping uplink grants, and/or intra-UE prioritization between uplink grants and overlapping scheduling requests (SRs). The intra-UE prioritization may include MAC LCH based prioritization based on LCH priority only, MAC LCH based prioritization based on a combination of LCH priority and quality of service flow identifier QFI priority, MAC QFI based prioritization based on QFI priority only, and/or network-configuration controlled selection of a prioritization variant.

In some embodiments, the MAC layer may receive information providing a mapping between QoS flows and LCHs for scheduling multiple QoS flows mapped to the same data radio bearer (DRB). This information may be provided via the radio resource control (RRC) layer conveying QoS-flow-to-DRB/LCH mapping to the MAC layer, via the SDAP layer informing the MAC layer of the QoS-flow-to-DRB/LCH mapping for a QoS, via a QFI field in an LCH configuration information element, via an LCP restriction, and/or via a QFI parameter in a CG configuration information element. The SDAP layer may also send an indication of the determination (that the wireless communication resources allocated to the device need to be adjusted) to the MAC layer when the determination is made by the SDAP layer, in which case the determination corresponds to a given QoS flow and is based on jitter and/or variation of packet arrival times, variation of packet size distribution, unexpected variation of otherwise regular packet sizes, unexpected variation of buffer status for SDAP input buffers for uplink communication, and/or variation of packet residency times for the SDAP input buffers for uplink communications.

Note that the techniques described herein may be implemented in and/or used with a number of different types of devices, including but not limited to, base stations, access points, cellular phones, portable media players, tablet computers, wearable devices, head-mounted displays, VR displays, wearable glasses, XR devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 7 shows a simplified flow diagram of a method for fast resource allocation adjustment and MAC awareness of QoS flows in wireless communications, according to some embodiments.

Figure 1:
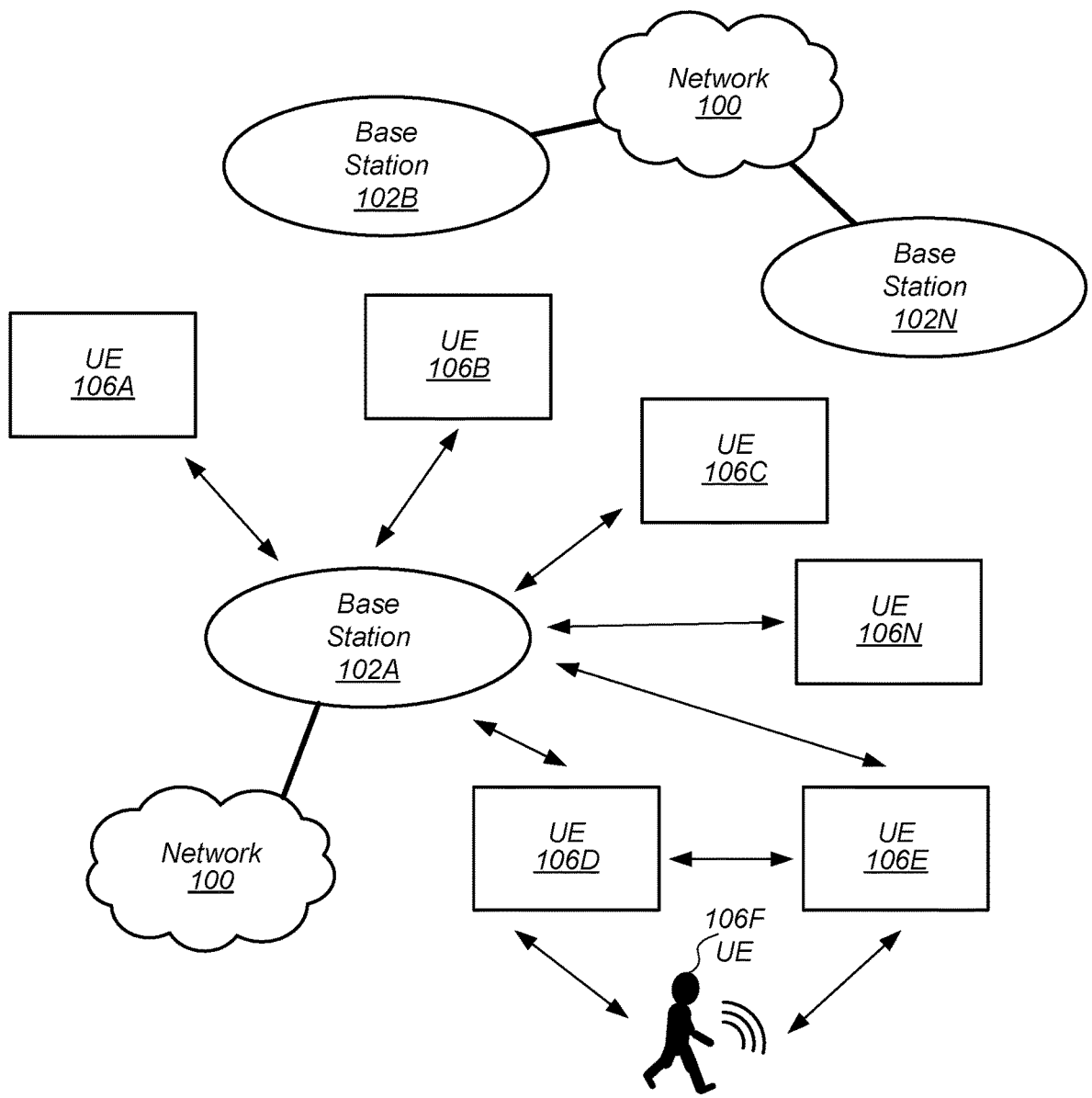
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AF: Application Function
AMF: Access and Mobility Management Function
AMR: Adaptive Multi-Rate
AP: Access Point
APN: Access Point Name
APR: Applications Processor
AS: Access Stratum
BS: Base Station
BSR: Buffer Status Report
BSSID: Basic Service Set Identifier
CBRS: Citizens Broadband Radio Service
CBSD: Citizens Broadband Radio Service Device
CCA: Clear Channel Assessment
CCE: Control Channel Elements
CMR: Change Mode Request
CN: Core Network
CORESET: Control Resource Set
CS: Cyclic Shift
DL: Downlink (from BS to UE)
DMRS: Demodulation Reference Signal
DN: Data Network
DRB: Data Radio Bearer
DSDS: Dual SIM Dual Standby
DYN: Dynamic
EDCF: Enhanced Distributed Coordination Function
eSNPN: Equivalent Standalone Non-Public Network
FDD: Frequency Division Duplexing
FT: Frame Type
GAA: General Authorized Access
GPRS: General Packet Radio Service
GSM: Global System for Mobile Communication
GTP: GPRS Tunneling Protocol
HPLMN: Home Public Land Mobile Network
IMS: Internet Protocol Multimedia Subsystem
IOT: Internet of Things
IP: Internet Protocol
KPI: Key Performance Indicator
LAN: Local Area Network
LBT: Listen Before Talk
LCP: Logical Channel Prioritization
LQM: Link Quality Metric
LTE: Long Term Evolution
MCC: Mobile Country Code
MNO: Mobile Network Operator
MO: Monitoring Occasion
NAS: Non-Access Stratum
NEF: Network Exposure Function
NF: Network Function
NG-RAN: Next Generation Radio Access Network
NID: Network Identifier
NMF: Network Identifier Management Function
NPN: Non-Public (cellular) Network
NRF: Network Repository Function
NSI: Network Slice Instance
NSSAI: Network Slice Selection Assistance Information
OFDM: Orthogonal Frequency Division Multiplexing
OOC: Out Of Coverage
PBCH: Physical Broadcast Channel
PCF: Point Coordination Function
PDB: Packet Delay Budget
PDCP: Packet Data Convergence Protocol
PDN: Packet Data Network
PDU: Protocol Data Unit
PGW: PDN Gateway
PLMN: Public Land Mobile Network
PRACH: Physical Random Access Channel
PRB: Physical Resource Block
PRI: Physical Uplink Control Channel (PUCCH) Resource Indicator
PSCCH: Physical Sidelink Control Channel
PSFCH: Physical Sidelink Feedback Channel
PSSCH: Physical Sidelink Shared Channel
PSD: Power Spectral Density
PSS: Primary Synchronization Signal
PT: Payload Type
PTRS: Phase Tracking Reference Signal
PUCCH: Physical Uplink Control Channel
QBSS: Quality of Service Enhanced Basic Service Set
QFI: Quality of Service Flow Identifier
QI: Quality Indicator
QoE: Quality of Experience
QoS: Quality of Service
RA: Registration Accept
RAN: Radio Access Network
RAR: Random Access Response
RAT: Radio Access Technology
RF: Radio Frequency
ROHC: Robust Header Compression
RR: Registration Request
RRC: Radio Resource Control
RSRP: Reference Signal Receive Power
RTP: Real-time Transport Protocol
RX: Reception/Receive
SAS: Spectrum Allocation Server
SD: Slice Descriptor
SDAP: Service Data Adaptation Protocol
SDU: Service Data Unit
SI: System Information
SIB: System Information Block
SID: System Identification Number
SIM: Subscriber Identity Module
SGW: Serving Gateway
SMF: Session Management Function
SNPN: Standalone Non-Public Network
SPS: Semi-Persistent Scheduling
SSB: Synchronization Signal Block
SSS: Secondary Synchronization Signal
SUPI: Subscription Permanent Identifier
TBS: Transport Block Size
TCP: Transmission Control Protocol
TDD: Time Division Duplexing
TDRA: Time Domain Resource Allocation
TPC: Transmit Power Control
TSC: Time Sensitive Communication
TSCAI: Time Sensitive Communication Assistance Information
TX: Transmission/Transmit
UAC: Unified Access Control
UDM: Unified Data Management
UDR: User Data Repository
UE: User Equipment
UI: User Input
UL: Uplink (from UE to BS)
UMTS: Universal Mobile Telecommunication System
UPF: User Plane Function
URLLC: Ultra-Reliable Low Latency Communication
URM: Universal Resources Management
URSP: UE Route Selection Policy
USIM: User Subscriber Identity Module
Wi-Fi: Wireless Local Area Network (WLAN) RAT based on the Institute of Electrical and Electronics Engineers' (IEEE) 802.11 standards
WLAN: Wireless LAN
XR: Extended Reality

Terms

The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, processor internal memory, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, wearable glasses, head-mounted displays, XR devices, portable Internet devices, music players, data storage devices, or other handheld devices, unmanned aerial vehicles (e.g., drones) and unmanned aerial controllers, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. 5G NR, LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band (or Frequency Band)—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Transmission Scheduling—Refers to the scheduling of transmissions, such as wireless transmissions. In some implementations of cellular radio communications, signal and data transmissions may be organized according to designated time units of specific duration during which transmissions take place. As used herein, the term "slot" has the full extent of its ordinary meaning, and at least refers to a smallest (or minimum) scheduling time unit in wireless communications. For example, in 3GPP LTE, transmissions are divided into radio frames, each radio frame being of equal (time) duration (e.g. 10 ms). A radio frame in 3GPP LTE may be further divided into a specified number of (e.g. ten) subframes, each subframe being of equal time duration, with the subframes designated as the smallest (minimum) scheduling unit, or the designated time unit for a transmission. Thus, in a 3GPP LTE example, a "subframe" may be considered an example of a "slot" as defined above. Similarly, a smallest (or minimum) scheduling time unit for 5G NR (or NR, for short) transmissions is referred to as a "slot". In different communication protocols the smallest (or minimum) scheduling time unit may also be named differently.

Resources—The term "resource" has the full extent of its ordinary meaning and may refer to frequency resources and time resources used during wireless communications. As used herein, a resource element (RE) refers to a specific amount or quantity of a resource. For example, in the context of a time resource, a resource element may be a time period of specific length. In the context of a frequency resource, a resource element may be a specific frequency bandwidth, or a specific amount of frequency bandwidth, which may be centered on a specific frequency. As one specific example, a resource element may refer to a resource unit of 1 symbol (in reference to a time resource, e.g. a time period of specific length) per 1 subcarrier (in reference to a frequency resource, e.g. a specific frequency bandwidth, which may be centered on a specific frequency). A resource element group (REG) has the full extent of its ordinary meaning and at least refers to a specified number of consecutive resource elements. In some implementations, a resource element group may not include resource elements reserved for reference signals. A control channel element (CCE) refers to a group of a specified number of consecutive REGs. A resource block (RB) refers to a specified number of resource elements made up of a specified number of subcarriers per specified number of symbols. Each RB may include a specified number of subcarriers. A resource block group (RBG) refers to a unit including multiple RBs. The number of RBs within one RBG may differ depending on the system bandwidth.

Bandwidth Part (BWP)—A bandwidth part (BWP) is a contiguous set of physical resource blocks selected from a contiguous subset of the common resource blocks for a given numerology on a given carrier. For downlink, a UE may be configured with up to a specified number of carrier BWPs (e.g. four BWPs, per some specifications), with one BWP per carrier active at a given time (per some specifications). For uplink, the UE may similarly be configured with up to several (e.g. four) carrier BWPs, with one BWP per carrier active at a given time (per some specifications). If a UE is configured with a supplementary uplink, then the UE may be additionally configured with up to the specified number (e.g. four) carrier BWPs in the supplementary uplink, with one carrier BWP active at a given time (per some specifications).

Multi-cell Arrangements—A Master node is defined as a node (radio access node) that provides control plane connection to the core network in case of multi radio dual connectivity (MR-DC). A master node may be a master eNB (3GPP LTE) or a master gNB (3GPP NR), for example. A secondary node is defined as a radio access node with no control plane connection to the core network, providing additional resources to the UE in case of MR-DC. A Master Cell group (MCG) is defined as a group of serving cells associated with the Master Node, including the primary cell (PCell) and optionally one or more secondary cells (SCell). A Secondary Cell group (SCG) is defined as a group of serving cells associated with the Secondary Node, including a special cell, namely a primary cell of the SCG (PSCell), and optionally including one or more SCells. A UE may typically apply radio link monitoring to the PCell. If the UE is configured with an SCG then the UE may also apply radio link monitoring to the PSCell. Radio link monitoring is generally applied to the active BWPs and the UE is not required to monitor inactive BWPs. The PCell is used to initiate initial access, and the UE may communicate with the PCell and the SCell via Carrier Aggregation (CA). Currently Amended capability means a UE may receive and/or transmit to and/or from multiple cells. The UE initially connects to the PCell, and one or more SCells may be configured for the UE once the UE is in a connected state.

Core Network (CN)—Core network (or backbone) is defined as a part of a 3GPP system which is independent of the connection technology (e.g. the Radio Access Technology, RAT) of the UEs. The UEs may connect to the core network via a radio access network, RAN, which may be RAT-specific. Oftentimes a CN may be a part of a computer network which interconnects networks, providing a path for the exchange of information between different Local Area Networks (LANs) or subnetworks. A CN may also tie together diverse networks in the same building, in different buildings in a campus environment, or over wide areas. Normally, the CN's capacity is greater than the networks connected to it.

Ultra-Reliable Low Latency Communication (URLLC)—URLLC refers to the use of a network for mission critical (or essential) applications that require uninterrupted and robust data exchange.

Time Sensitive Communication (TSC)—In comparison to URLLC, TSC has stricter requirements in terms of latency and reliability, and may at times require absolute time-synchronization and on-time delivery of packets for deterministic and isochronous real-time applications. The success of TSC depends on effective scheduling of TSC traffic flows.

Extended Reality (eXtended Reality, XR)—XR is an umbrella term that encompasses Virtual Reality (VR), Augmented Reality (AR), and Mixed Reality (MR), and represents one of the most important media applications under consideration for establishing ways in which people interact with media.

Service Data Unit (SDU)—An SDU is a unit of data that has been passed down from an Open Systems Interconnection layer or sublayer to a lower layer. An SDU has not yet been encapsulated into a protocol data unit (PDU) by the lower layer.

Service Data Adaptation Protocol (SDAP)—The SDAP is responsible for QoS flow handling across the on-air (e.g. NR air) interface. In particular, the SDAP maps a specific QoS flow to a corresponding Data Radio Bearer (DRB) which has been established with the appropriate level of QoS. In NR sidelink communications, the SDAP sublayer maps PC5 (i.e. sidelink, SL) quality of service (QoS) flows to SL data radio bearers (SL-DRBs).

NR Channel Hierarchy—In order to group the data to be sent over the NR radio access network, the data is organized in a specific way. As there are many different functions associated with data transmitted over the radio communications link, they need to be clearly marked and have defined positions and formats. Accordingly, several different forms of data channels are defined and used. The higher level channels are mapped to or contained within other channels until the physical level is reached. A physical channel contains all the data from higher level channels. This provides a logical and manageable flow of data from the higher levels of the protocol stack down to the physical layer. Three main types of data channels are used within mobile communications systems, e.g. in NR communication systems.

Logical Channel (LCH)—Logical channels may belong into one of two groups: control channels and traffic channels. Control channels are used for the transfer of data from the control plane while Traffic channels are used for the transfer of user plane data.

Transport Channel (TCH)—The Transport channel represents the multiplexing of the logical data to be transported by the physical layer and its channels over the radio interface.

Physical Channel (PCH)—The physical channels are closest to the actual transmission of the data over the radio access network/NR radio frequency signal and are used to carry the data over the radio interface. Higher level channels are often mapped to Physical channels to provide a specific service. The Physical channels carry payload data or details of specific data transmission characteristics like modulation, reference signal multiplexing, transmit power, RF resources, etc.

Network exposure function (NEF)—The NEF is a function in the 3GPP core network architecture that provides a means to securely expose capabilities and events. The NEF stores the received information as structured data and exposes it to other network functions.

Point coordination function (PCF)—The PCF is a media access control (MAC) technique used to coordinate communications within a communication network.

User Plane Function (UPF)—The UPF is one of the network functions (NFs) of the 5G/NR core network and is responsible for packet routing and forwarding, packet inspection, QoS handling, and external PDU session for interconnecting Data Network (DN), in the NR architecture.

Media Access Control (MAC) Control Element (MAC CE)—In at least LTE and NR communications, several communication paths exist at the MAC layer, with a specified MAC structure carrying special control information. The specified MAC structure carrying the control information is referred to as a "MAC CE". The MAC CE operates between UE (MAC) and base station (MAC) for fast signaling communication exchange that does not involve upper layers. A MAC CE is sent as a part of MAC PDU. For NR uplink communications, MAC CEs are typically placed at the end of the MAC PDU. For NR downlink communications, MAC CEs are typically placed at the beginning of the MAC PDU.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
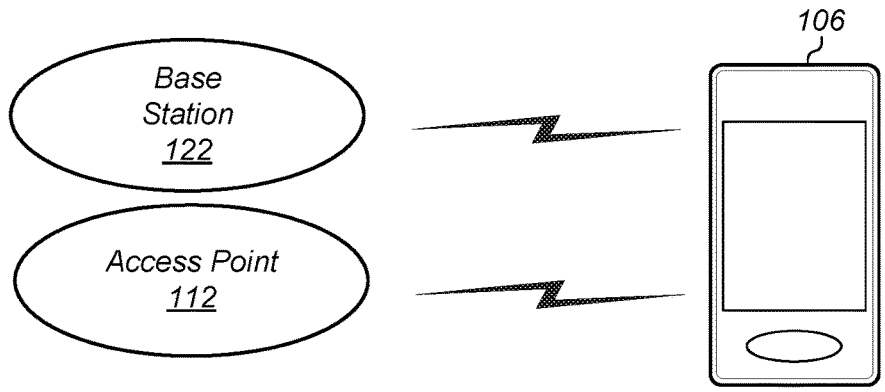
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes base stations 102A through 102N, also collectively referred to as base station(s) 102 or base station 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UE(s) 106 or UE 106.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, neutral host or various CBRS (Citizens Broadband Radio Service) deployments, among various possibilities). Thus, the base station 102A may facilitate communication between the user devices 106 and/or between the user devices 106 and the network 100. In particular, the cellular base station 102A may provide UEs 106 with various telecommunication capabilities, such as voice, short message service (SMS) and/or data services. The communication area (or coverage area) of the base station 106 may be referred to as a "cell." It is noted that "cell" may also refer to a logical identity for a given wireless communication coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station(s) 102 and the user devices 106 may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if the base station 102A is implemented in the context of LTE, it may alternately be referred to as an 'eNodeB' or 'eNB'. Similarly, if the base station 102A is implemented in the context of 5G NR, it may alternately be referred to as 'gNodeB' or 'gNB'. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to private networks. Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices 106 and/or between the user devices 106 and the network 100. In particular, the cellular base station 102A may provide UEs 106 with various telecommunication capabilities, such as voice, SMS and/or data services. UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). Base station 102A and other similar base stations (such as base stations 102B . . . 102N) operating according to the same or a different cellular communication standard may thus be provided as one or more networks of cells, which may provide continuous or nearly continuous overlapping service to UE 106 and similar devices over a wide geographic area via one or more cellular communication standards.

Thus, while base station 102A may act as a "serving cell" for UEs 106A-106N as illustrated in FIG. 1, each one of UE(s) 106 may also be capable of receiving signals from (and may possibly be within communication range of) one or more other cells (possibly provided by base stations 102B-102N and/or any other base stations), which may be referred to as "neighboring cells". Such cells may also be capable of facilitating communication in-between user devices 106 and/or between user devices 106 and the network 100. Such cells may include "macro" cells, "micro" cells, "pico" cells, and/or cells which provide any of various other granularities of service area size. For example, base stations 102A-102B illustrated in FIG. 1 may be macro cells, while base station 102N may be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, the UE 106 may also communicate with Network 100, through one or more base stations or through other devices, stations, or any appliances not explicitly shown but considered to be part of Network 100. UE 106 communicating with a network may therefore be interpreted as the UE(s) 106 communicating with one or more network nodes considered to be a part of the network and which may interact with the UE(s) 106 to conduct communications with the UE(s) 106 and in some cases affect at least some of the communication parameters and/or use of communication resources of the UE(s) 106.

As also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting in a similar manner with the vehicles represented by UEs 106D and 106E. Various embodiments of vehicles communicating in a network exemplified in FIG. 1 are disclosed, for example, in the context of vehicle-to-everything (V2X) communications such as the communications specified by certain versions of the 3GPP standard, among others.

FIG. 2 illustrates an exemplary user equipment 106 (e.g., one of UEs 106A through 106N) in communication with the base station 122 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, e.g. those previously mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include radio circuitries for communicating using either of LTE or CDMA2000 1×RTT or NR, and separate radios for communicating using each of Wi-Fi and BLUETOOTH™. Other configurations are also possible.

Figure 3:
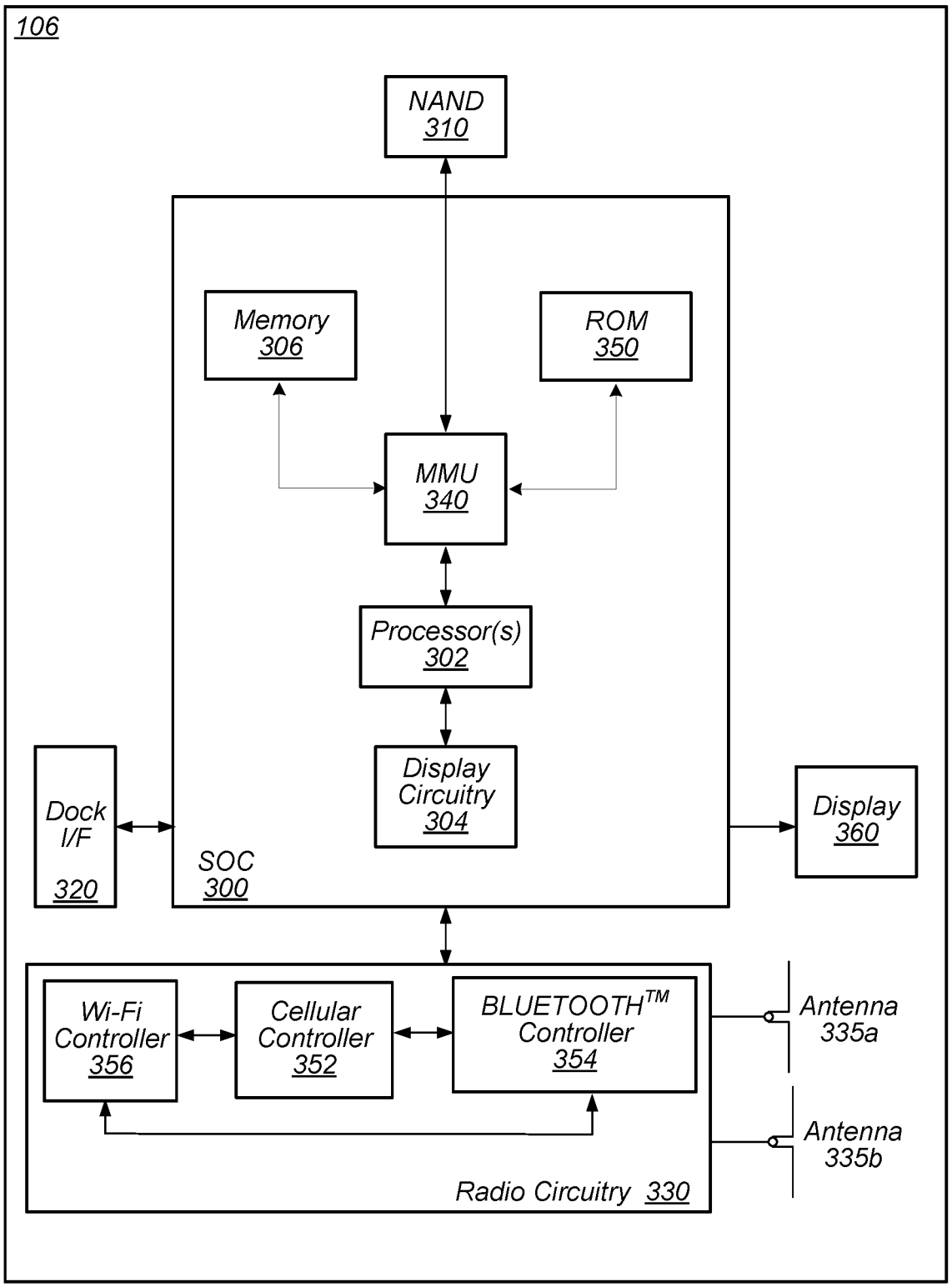
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include various elements/components for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 according to various embodiments disclosed herein. Specifically, processor(s) 302 may be coupled to and/or may interoperate with other components as shown in FIG. 3 to facilitate UE 106 communicating in a manner that seeks to optimize RAT selection. Processor(s) 302 may also implement various other applications and/or end-user applications running on UE 106.

Figure 5:
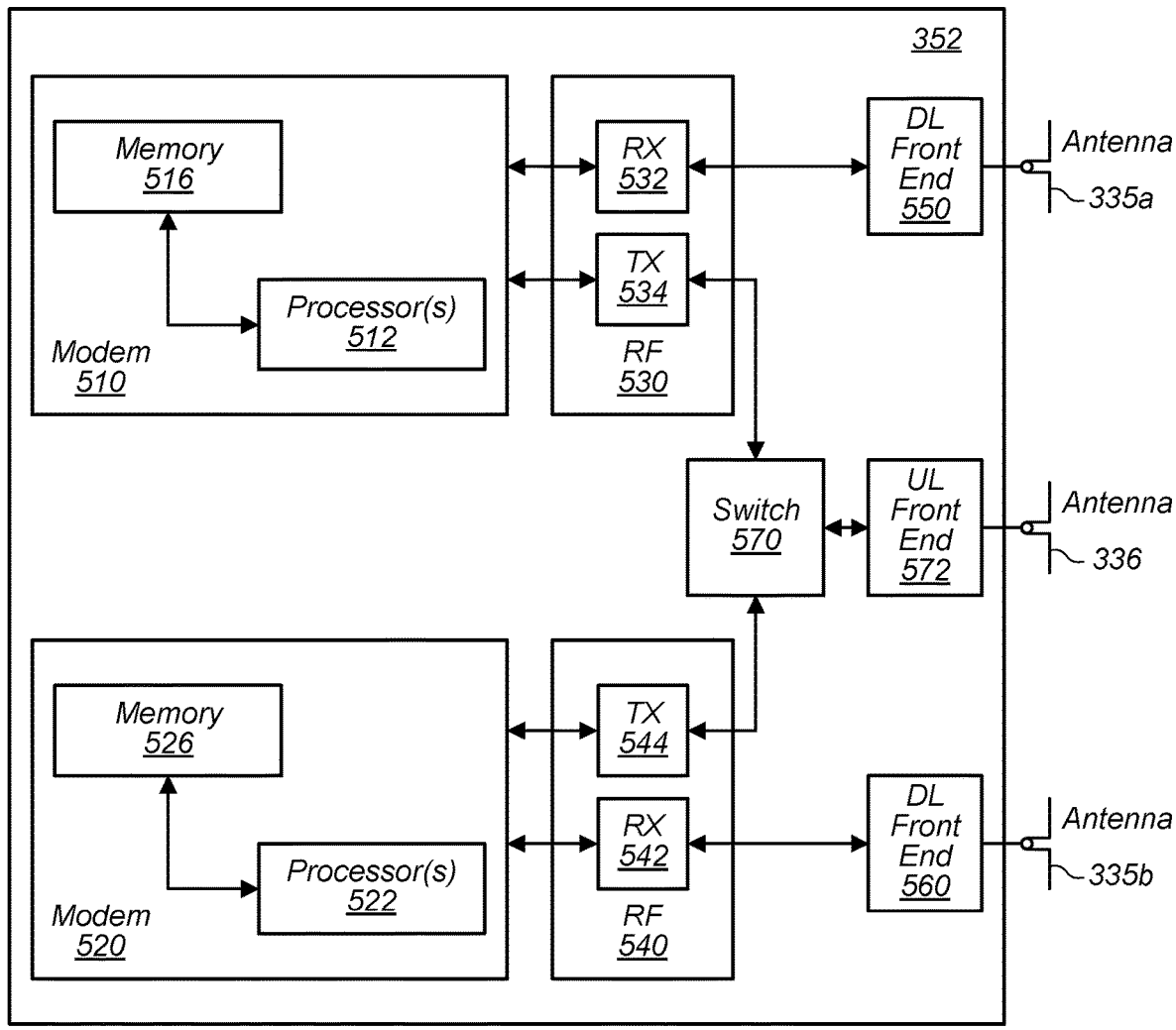
FIG. 5 shows an exemplary simplified block diagram illustrative of cellular communication circuitry, according to some embodiments.

In some embodiments, radio circuitry 330 may include separate controllers dedicated to controlling communications for various respective RATs and/or RAT standards. For example, as shown in FIG. 3, radio circuitry 330 may include a Wi-Fi controller 356, a cellular controller (e.g. LTE and/or NR controller) 352, and BLUETOOTH™ controller 354, and according to at least some embodiments, one or more or all of these controllers may be implemented as respective integrated circuits (ICs or chips, for short) in communication with each other and with SOC 300 (e.g. with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments may have fewer or more similar controllers for various different RATs and/or RAT standards that may be implemented in UE device 106. For example, at least one exemplary block diagram illustrative of some embodiments of cellular controller 352 is shown in FIG. 5 and will be further described below.

Figure 4:
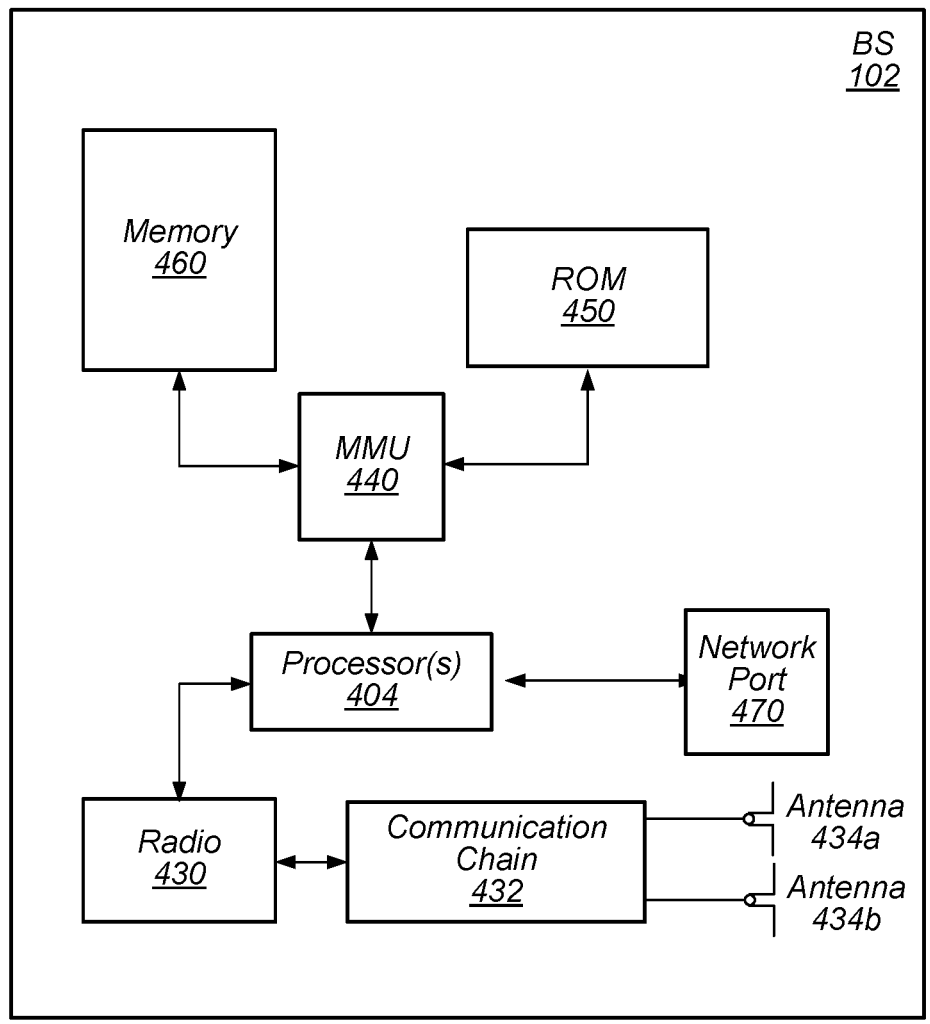
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434a, and possibly multiple antennas (e.g. illustrated by antennas 434a and 434b), for performing wireless communication with mobile devices and/or other devices. Antennas 434a and 434b are shown by way of example, and base station 102 may include fewer or more antennas. Overall, the one or more antennas, which may include antenna 434a and/or antenna 434b, are collectively referred to as antenna 434 or antenna(s) 434. Antenna(s) 434 may be configured to operate as a wireless transceiver and may be further configured to communicate with UE devices 106 via radio circuitry 430. The antenna(s) 434 communicates with the radio 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR (NR) WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device as disclosed herein. Alternatively, the processor(s) 404 may be configured as a programmable hardware element(s), such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for communicating with mobile devices.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more components. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

URLLC and XR Communications

Figure 6:
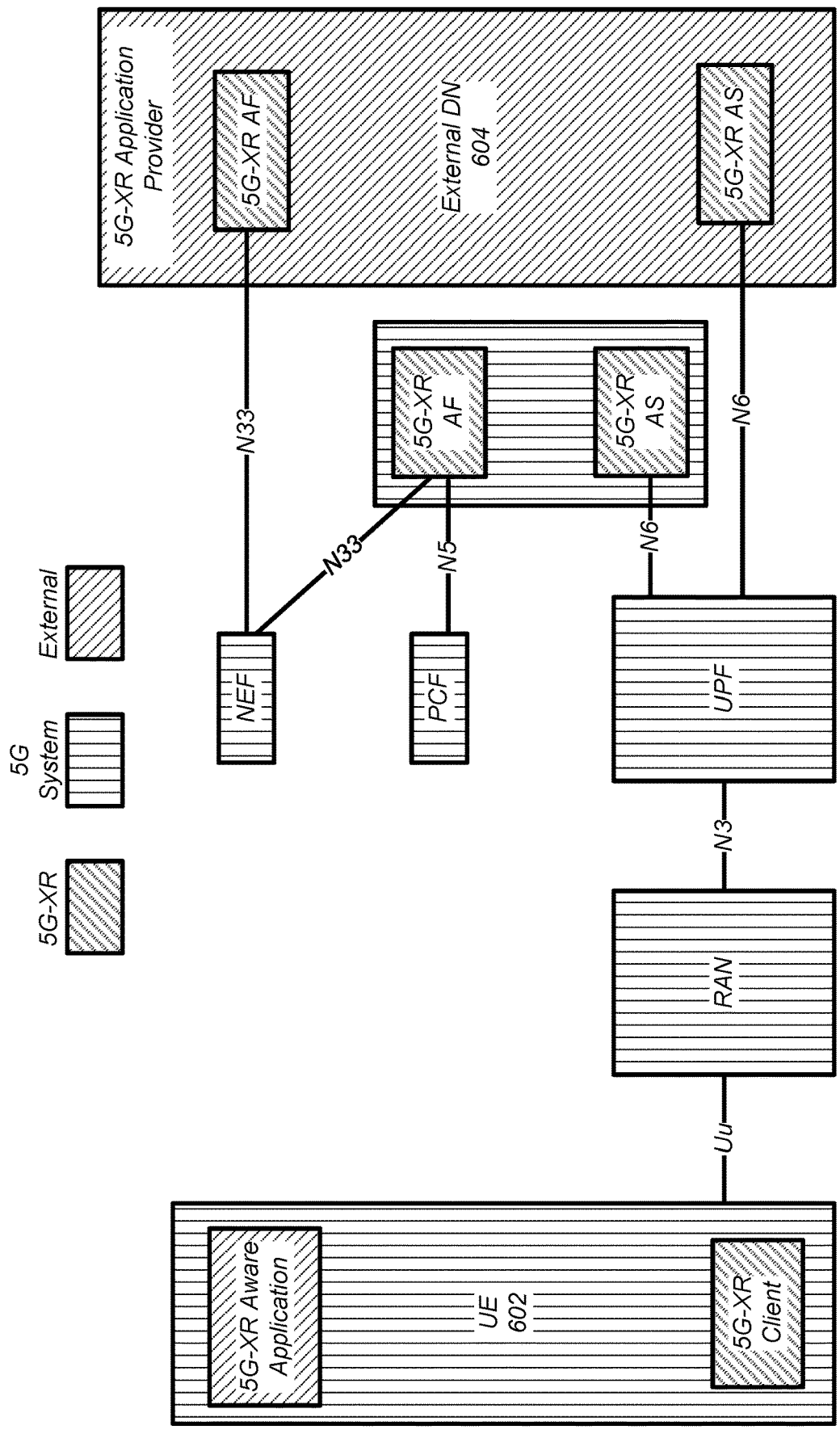
FIG. 6 shows a simplified system architecture diagram illustrating a communication infrastructure for wireless communications.

FIG. 6 shows a simplified system architecture diagram illustrating a communication infrastructure for wireless communications, e.g. NR communications. As illustrated in FIG. 6, a UE 602 may communicate with an external Data Network (DN) 604 through various network layers and functions. Each function/layer/element may communicate with specific other elements via corresponding established interfaces/interface types. For example, UE 602 may be executing 5G-XR aware applications as a 5G-XR client and may communicate with external DN 604 via a radio access network (RAN) through the User Plane Function (UPF). Accordingly, UE 602 may communicate with the RAN via a Uu interface, which represents an interface established between UE 602 and a base station (e.g. of a cell) in the RAN.

The XR services shown in FIG. 6 may require deterministic behavior with a defined QoS, typically requiring multiple streams (or different periodicity) with low latency. These services benefit from multiple configured grants (CGs) and DL SPS for streams with e.g. periodic traffic. Such traffic typically uses CGs to reduce latency. For XR traffic multiple QoS flows may be mapped to the same data radio bearer (DRB)/logical channel (LCH). Each QoS flow may have its own set of QoS characteristics, and if a different QoS treatment is needed for each of the QoS flows, the network typically maps them to different DRBs. However, this may not always be possible given the larger amount of traffic flows in XR. Thus for XR, there may be configurations where multiple QoS flows are mapped to the same LCH more frequently. If a different QoS treatment is needed for different QoS flows on the same LCH then awareness of the QFI at the MAC layer level may be very useful. The 3GPP Standard (see e.g. TR 26.928) includes an overview of XR use-cases. However, a base station (e.g. gNB) may not always receive sufficient scheduling assistance information from within the network, as Time Sensitive Communication (TSC) Assistance Information (TSCAI) is optional in the Core Network (CN). For example, there are URLLC/XR use cases related to data processing in which TSCAI may not be available from a central network entity. Furthermore, UE assistance information to assist the network with scheduling information is currently not available for XR.

Fast Traffic Pattern Adjustments

For URLLC and/or XR services requiring deterministic and/or periodic traffic, a UE may need to inform the network of potential updates or alterations in its traffic patterns over time, so that radio resource allocations (e.g., configured grants (CG) or semi-persistent scheduling (SPS)) can be adjusted. For a given traffic flow, packet arrival times, buffer states can change over time, and a low delay budget may imply the need to trigger fast adjustments for connection parameters such as periodicity, packet size distribution, and packet arrival times associated with the radio resources allocated to the UE. To put it another way, there may be a need for fast adjustments to parameters having a bearing on resources allocated to the UE. Such fast adjustments may not only shorten the latency, they may also reduce UE power consumption.

There are various cases and/or conditions in which a UE might benefit from and adjustment of certain parameters, e.g. Configured Grant (CG) parameters like periodicity, burst size, or burst arrival time.

One case is when a sudden surge of concurrent traffic on logical channels (LCHs) of other services and traffic flows that have the same or higher priority may lead to a different split of sending rates per DRB after logical channel prioritization. This may only be of a temporary nature but low latency requires a quick reaction time on pre-empted or underserved DRBs, otherwise, the service quality of the XR/URLLC traffic is likely to deteriorate.

Another case may be frame rate driven. For example, if an application layer frame rate does not scale by multiples of a slot length or a radio frame (e.g., FPS 60 or FPS 90), burst arrival is going to incur a slip with an offset over time.

Yet another case involves the possibility for internal delays (temporarily) accumulating to different packet arrival times, potentially leading to abnormal behavior.

Another case includes temporarily altered packet arrival times due to failures at other protocol layers, which may also lead to abnormal behavior.

Finally, the UE may be preempted due to intra-UE prioritization and/or a cancellation indication which lead(s) to mistimed data transmission (e.g. the data cannot be transmitted on time) while the buffer fills up with more packets. This may result in the UE requiring additional resources for transmission.

In such cases, the UE may have to adjust certain parameters, e.g., burst timing and periodicity, and/or obtain more resources. However, there are currently no suitable mechanisms to signal UE traffic patterns and periodicity related information through the NR access stratum. The UE can only rely on buffer status reports (BSRs) and/or scheduling requests (SRs) using the NR MAC. In other words, only BSRs and/or SRs are available to the UE whilst using the NR MAC.

Mapping Between QoS Flows, Logical Channels, and Grants

For XR traffic, the UE may not only have many different streams of concurrent data (for audio, video, and other data and control), but multiple different streams may have similar QoS requirements. As a result, multiple QoS flows may be mapped to the same DRB (logical channel) more frequently. Each of the QoS flows may have its own traffic arrival pattern, QoS characteristics and presumably its own set of associated configured grants (CGs). However, the MAC layer cannot currently identify different QoS flows within a LCH and no clear mapping exists between CGs and QoS flows/QFIs. This means that the MAC layer cannot select the most appropriate data when constructing a MAC PDU as it cannot identify SDUs based on QoS flows or QFIs within the LCH. For example, based on upper layer traffic flows associated with a DRB, a given logical channel (LCH) may be intended to have a 1:1 mapping between QoS flow 1 and CG1, a 1:1 mapping between QoS flow 2 and CG2, and QoS flow 3 could be mapped to CG3 and CG4. No clear mapping exists between QoS flows and radio resources (such as CGs) for a given logical channel (LCH) in the current NR specifications. That is, multiple QoS flows can be mapped to the same DRB/logical channel (LCH) while at the same time the network can configure multiple CGs for the same LCH. There is no clear mapping between QoS flows and CGs (or grants in general) within the same LCH. Furthermore, as mentioned above with respect to fast traffic pattern adjustments, while it may be advantageous to suggest, to the network, a periodicity adjustment for a QoS flow (e.g., based on buffer status or when there is a lot of high priority data in the buffer for a certain QoS flow), the MAC (layer) cannot identify such packets as it does not currently have access to the requisite QFI.

MAC CE Based (MAC Triggered) Traffic Pattern Indication

In order to address the issues referenced above, one or more mechanisms may be established to implement various MAC based or MAC triggered traffic indications provided by the UE to the network/base station. Under certain circumstances, an application may detect that the QoE or QoS of a (wireless) connection deteriorates. When this happens, the application may detect the need for a temporary boost of the quality of the (wireless) connection (e.g., without changing the codec rate), and it may explicitly request a periodicity adjustment or it may signal (indicate) an update of burst arrival times, etc. Similarly, for critical traffic with bounded latency, the MAC layer itself may detect longer residency times for the data in the transmission buffer and once a buffer residency time threshold has been exceeded, the MAC layer may trigger an adjustment or an assistance indication to the network.

In addition, the structure of the application layer payload may be at least partially known in advance of a transmission/playout event (e.g., knowledge of multimedia content stored on memory internal to the device). This advance knowledge or information pertaining to the application layer payload may be used to predict burst size, periodicity etc., and a request for an appropriate parameter adjustment may be made ahead of time. The requested adjustment may be applied either temporarily (for a limited period of time) or persistently as an update to the connection setting (or wireless communication resource allocation).

Temporary Boost Request—In some embodiments, the application layer may query (or request) lower layers for a temporary boost of resources, e.g. for a specified or predefined period of time. Reception of such query/request may trigger a new MAC Control Element (MAC CE) that carries information indicating one or more of the following:

a request to switch to a next lower CG periodicity, e.g., selected from a list of predefined periodicities, or a switch to a specific periodicity value;
 a request to change the grant size of the CG;
 a detailed request corresponding to a specific parameter set (periodicity, burst arrival etc.) for the CG.

In some embodiments, the query (or request) from the application layer may simply be a Boolean flag sent to the MAC layer as a trigger, and the MAC layer may act on the trigger based on predefined conditions. Predefined conditions and reactions may be configured by the network (e.g. a base station such as gNB for NR) or assumed to be followed by the UE according to the protocol. For example, the MAC CE may be set to include specific information (e.g. associated with the predefined conditions) in response to the MAC layer receiving the Boolean flag. The MAC may also request temporarily boost of resources without an upper layer trigger, for example based on internal MAC trigger conditions even though the prevalent mechanism for updating UL resources is currently performed via BSRs. Similarly, SDAP (which has knowledge of the QFI) may send a boost request trigger to the MAC (layer). The ability to issue a boost request (and the indication regarding which QFIs are targeted by the boost request) may be controlled by the network through RRC.

Persistent Adjustment Request—Adjustment requests may be based on predefined thresholds/conditions where the UE indicates a set of requested values to the network.

Uplink Resource Request (URR) MAC CE—Pursuant to the above, a new uplink MAC CE may be introduced. This MAC CE may be transmitted in the uplink direction, and may be triggered by the MAC layer itself. Alternatively, the MAC CE may be triggered by the application layer, for example when an application requires a temporary boost of connection quality. As another option, the MAC CE may be triggered by the SDAP layer. The URR MAC CE may be used as a method for fast adjustment of XR related parameters (e.g. periodicity) or adjustment of radio resources/CGs. In the DL direction, the cell/base station (e.g. gNB) scheduler may supervise and track buffer residence times associated with DL SPS and other PDSCHs. In some embodiments, the same method (URR MAC CE) may be used for DL direction as well.

MAC CE Parameter Set—The URR MAC CE may be used to provide indications of parameters (e.g. corresponding parameter values) that include:

Identity: LCH, QFI, or CG identity (index);
 Requested Periodicity (e.g., parameter values may be defined in a table and the table index may be provided via signaling);
 Requested Burst Timing, e.g., based on burst arrival times and according to transmit/receive (TX/RX) radio time; including "burst start", "burst end", and/or "burst arrival time+burst spread";
 Requested Burst Size in bytes, which may be optionally associated with a packet size distribution (to signal variation of burst sizes over time, e.g., based on statistical models or by indicating a minimum/maximum byte range and/or by indicating a fixed pattern);
 Requested Reliability (e.g., to request higher/lower protection—based on HARQ or RLC retransmissions detected);
 Validity indication: temporary boost (resource adjustment for a limited time only), or permanent/persistent boost; and
 KPI (key performance indicator) parameters (e.g. parameter values), which may include:
  delay indication (extra delay incurred), which may be expressed as a percentage or may be provided as an absolute value; and
  Indication of associated buffer residence time (e.g., for the transmission buffer in the MAC layer)—this parameter may assist the network in identifying how severe the problem is, and may help allocate resources more appropriately. It should be noted that the network scheduler may already estimate this to some extent, based on the BSR.

Different combinations of MAC CE parameters are possible, with some of the parameters designated as optional and other parameters designated as essential. For example, in some embodiments all parameters except Identity and Validity Indication may be optional. Alternatively, the BSR MAC CE may be enhanced with a set of similar parameters.

MAC Trigger Conditions—The MAC CE for traffic pattern or periodicity adjustment may be triggered based on several factors and/or conditions. In some embodiments, these factors/conditions may include:

Jitter and/or average packet residence time in the transmission buffer; e.g., the UE may track this for every packet, log it along with a CG, and build up associated/corresponding statistics;
 UE tracked residence times of SDUs in the transmission buffer from packet arrival to logical channel prioritization (LCP)/MAC PDU creation—for every configured grant, including:
  Ingress time: packet arrival in the transmission buffer; and
  Egress time: when the LCP starts and a MAC PDU is created for a CG;
 When the buffer residence time crosses a configured threshold for a CG (e.g., by violating multiple times the allocated portion of the packet delay budget, PDB, and/or its survival time); —the UE may trigger a periodicity adjustment and/or burst size increase through the new MAC CE, thereby indicating packet arrival time for the related CG, which may ensure UL data is transmitted on time, leading to shorter latency and better reliability;
 When the buffer residence time is considerably shorter than required (better than what is required per the QoS corresponding to the CG); —the UE may request a longer periodicity, and/or lower burst size, which may help conserve power. The same procedure may be applicable for dynamic grants (DGs) or the LCH as a whole, in which case the UE may trigger a periodicity adjustment based on LCH;
 Out of sequence (e.g., too early or too late) data arrival from upper layers;
 Packet size variations; and
 Repeated HARQ retransmissions, e.g., at several instances of a configured grant over a period of time (may trigger a MAC CE for reliability or burst timing adjustment, for example).

It should be noted that the MAC layer may be aware of the QFI in the future, and buffers may be formed based on QFIs as well. Accordingly, a MAC transmission buffer may represent an LCH buffer or QFI buffer (in case the MAC layer has awareness of the QFI).

The detailed algorithms may be internal to the UE. The UE may leave it up to the network to translate the request into an appropriate resource allocation, e.g. with a potentially different CG periodicity, or even multiple CGs. That is, the network, or base station (e.g. gNB) may adjust the resource allocation(s) based on the received MAC triggered request. The MAC CE may translate into, or may indicate, a requested 'number of bytes' over a (variable) period of time (indicated by periodicity). The network may be aware of the buffer status of the UE from the BSR, as well as from the QFI to DRB mapping, LCP restrictions and LCH to CG/SPS mappings. The network (e.g. base station) may use this information to allocate radio resources for the UE such that it can empty its LCH buffer accordingly (based on QoS). A resource allocation update may take place separately, using normal resource allocation procedures, provided that the periodicity update request is accepted by the network.

In some embodiments, a URR MAC CE may be triggered by the SDAP layer, based on several factors and/or conditions. In such cases, the SDAP layer may send an indication to the MAC layer. The factors/conditions may include one or more of the following for a given QoS flow:
jitter and/or the variation of packet arrival times;
variation of packet size distribution;
unexpected variation of otherwise regular packet sizes;
unexpected variation or change in buffer status (e.g., fill status, such as fill status for SDAP input buffers for uplink);
variation of packet residency times (i.e., for SDAP input buffers in uplink); or
several additional conditions internal to the SDAP layer.

MAC Scheduling Enhancement

In some embodiments, a LCH may be configured with a list of QFIs, in e.g. a Logical Channel Configuration IE (see e.g. 3GPP TS 38.331, "LogicalChannelConfig"; references to specific IEs are with respect to the 3GPP specification, e.g. 3GPP TS 38.331 as noted above), and each QFI may be assigned a priority. The MAC may use this to enhance LCH-based prioritization to not only consider the LCH priority but take into account the association with a QFI as well. This may be accomplished, for example, by the MAC maintaining separate QFI sub-buffers per LCH or at least a notion of the QFI for each packet (which may be done by implementation), and/or having a grant (CG or DG) be associated with a QFI. For example, the "LogicalChannelConfig" IE may have an LCP restriction that is linked with a QFI/LCH, and/or the Configured Grant Configuration ("configuredGrantConfig") IE may itself have a QFI inside. Other options are possible as well.

MAC scheduling enhancement with enhanced intra-UE prioritization—XR traffic characteristics (based on LCP restrictions and QFI) may be considered for scheduling and selecting data during logical channel prioritization in the MAC to ensure MAC SDUs for XR traffic are prioritized appropriately.

In some embodiments, the MAC may construct MAC PDUs/transport blocks (TBs)—e.g. select which MAC SDUs will be included for a given grant during LCP—based on QoS flows rather than logical channels (DRBs) only. Assuming a CG may be associated with a QoS flow (a QFI), the MAC may utilize that association during intra-UE prioritization. More generally, if the MAC is aware of the QFI then the prioritization of overlapping grants (CG/DG) may be enhanced as well. Both LCH and QFI may have an associated priority, which may be configured by the network (base station). Options for handling overlapping grants (configurable by the network, e.g. by a base station) may include:
Perform LCH-based prioritization based on LCH priority only (as in prescribed legacy behavior);
Perform LCH-based prioritization based on a combination of LCH and QFI; and
Perform QFI-based prioritization based on QFI priority only.

QoS flow awareness at MAC—To allow better scheduling of multiple QoS flows mapped to the same DRB, a mapping between QoS flows and LCHs may be provided to the MAC layer. In other words, the notion of QFI at the MAC level may be introduced and implemented. There are several ways in which QFI at the MAC level may be implemented. Specifically, at least the following mapping options may be used:
Option 1: The RRC and/or SDAP layer may inform the MAC layer of the QoS flow to DRB mapping for a given QoS flow;
Option 2: LCP restriction for CG configuration—according to this option (in reference to 3GPP TS 38.331) a QFI parameter may be added into the "allowedCGList>ConfiguredGrantConfigIndexMAC" in the "LogicalChannelConfig" IE; that is, a QFI field (or a list) may be added. The QFI may then be associated with a CG through an LCP restriction. If the list is not configured, then any QFI (of the given LCH) may be mapped to the CG, otherwise, only the QFIs in that list may be allowed;
Option 3: An LCP restriction may be used to inform the MAC layer of the QFI for a logical channel (in reference to 3GPP TS 38.331). An LCP may be restricted for certain QFIs per LCH, e.g. through a new list "allowed-QFI-list" in the "LogicalChannelConfig" IE. In this option the Logical Channel Configuration is expected to be consistent with the "SDAP-config" IE; and
Option 4: Provided directly in the "configuredGrantConfig" IE (in reference to 3GPP TS 38.331)—The QFI may be added as a parameter (for a CG mapped to a dedicated QFI or to a list of QFIs).

Other mappings/configuration options are possible and are contemplated. It may also be worth noting that an LCP restriction may be better than providing the QFI via the "configuredGrantConfig" IE itself because the same CG may be used for another LCH. Otherwise, as mentioned in 3GPP TS 38.300, if the QoS flows require different QoS treatment, the network may typically map such QFIs to different DRBs.

Pursuant to at least the above, FIG. 7 shows a simplified flow diagram of a method for fast resource allocation adjustment and MAC awareness of QoS flows in wireless communications, according to some embodiments. As illustrated in FIG. 7, a device, e.g. a wireless communication device or user equipment device (UE), may make a determination, by an application layer in the device and/or by a service data adaptation protocol layer in the device and/or by a media access control (MAC) layer in the device, that wireless communication resources allocated to the device need to be adjusted (702). In response to the determination, the device may transmit, in a MAC CE to a base station, a request for an adjustment by the base station of the allocated wireless communication resources (704).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An method comprising:
an application layer in a device or a service data adaptation protocol (SDAP) layer in the device or a media access control (MAC) layer in the device providing an indication that wireless communication resources allocated to the device need to be adjusted;
transmitting, in a MAC Control Element (MAC CE) from the device to a base station in response to the indication, a request for adjustment of the wireless communication resources by the base station, wherein the request comprises at least a delay indication based on a length of time data has remained in a transmission buffer of the device;
the application layer and/or the SDAP layer requesting lower relative layers for a temporary boost of resources in response to the indication; and
transmitting the MAC CE at least partially in response to the application layer and/or the SDAP layer requesting the temporary boost of resources.

2. The method of claim 1, wherein the indication is based on one or more of:
detection, by the application layer or by the SDAP layer or by the MAC layer, that a quality of a wireless connection of the device within a wireless network has deteriorated; or
advance knowledge of information pertaining to an application layer payload in the device.

3. The method of claim 2, further comprising:
transmitting the request according to one or more factors, based on the advance knowledge of information, wherein the one of more factors comprise one or more of:
burst size;
burst size distribution;
burst timing;
reliability; or
periodicity.

4. The method of claim 2, wherein the indication is based on a detection that present quality of service (QOS) and/or quality of experience (QoE) requirements for wireless communications of the device are not being met.

5. The method of claim 1, wherein the adjustment of the wireless communication resources is comprises one of:
a temporary adjustment for a limited period of time; or
a persistent update to the allocated wireless communication resources.

6. The method of claim 1, wherein the request further comprises one or more of:
a request for the base station to boost quality of an uplink wireless connection or a downlink connection of the device within a wireless network;
a request for a periodicity adjustment;
an indication of an update of burst arrival times;
an indication of an update of burst timing;
an indication of a burst size;
an indication of a burst size distribution; or
an indication of an update of reliability.

7. The method of claim 1, wherein the indication is by the MAC layer and is in response to one or more of:
the MAC layer detecting that data has remained in a transmission buffer longer than a maximum buffer residency time threshold; or
the MAC layer detecting that the data has remained in the transmission buffer shorter than a minimum buffer residency time threshold.

8. The method of claim 1, further comprising the application layer and/or the SDAP layer requesting the temporary boost of resources for a predefined period of time.

9. The method of claim 1, wherein the MAC CE further comprises one or more of:
a request to switch to a next lower configured grant (CG) periodicity;
a request to change a grant size of the CG; or
a detailed request corresponding to a specific parameter set for the CG.

10. The method of claim 1, wherein the adjustment of the wireless communication resources comprises adjustment of one or more of:
extended reality (XR) related parameters;
parameters related to fulfillment of quality of service (QOS) and/or quality of experience (QoE);
configured grants; or
radio resources.

11. The method of claim 1, wherein the MAC CE further comprises one or more of:
  logical channel identity information;
  quality of service flow identifier identity information;
  configured grant identity information;
  requested periodicity;
  requested burst timing;
  requested burst size;
  requested burst size distribution;
  requested reliability;
  validity indication; or
  key performance indicator parameter values.

12. The method of claim 1, wherein the indication is based on one or more of:
  buffer jitter;
  average packet buffer residence time;
  residence time of service data units in a logical channel buffer.

13. The method of claim 1, further comprising the MAC layer performing one or more of:
  maintaining a separate quality of service flow identifier (QFI) per logical channel (LCH) by establishing a mapping between respective QFIs and LCHs; or
  associating a given grant with a corresponding QFI.

14. The method of claim 1, further comprising the MAC layer performing one or more of:
  intra-device (intra-UE) prioritization between overlapping uplink grants; or
  intra-UE prioritization between uplink grants and overlapping scheduling requests (SRs), wherein the intra-UE prioritization comprises one of:
    MAC logical channel (LCH) based prioritization based on LCH priority only;
    MAC LCH based prioritization based on a combination of LCH priority and quality of service flow identifier QFI priority;
    MAC QFI based prioritization based on QFI priority only; or
    network-configuration controlled selection of a prioritization variant.

15. The method of claim 1, further comprising the MAC layer receiving information that provides a mapping between quality of service (QOS) flows and logical channels (LCHs) for scheduling multiple QoS flows mapped to a same data radio bearer (DRB).

16. The method of claim 15, wherein the information is received through one of:
  a radio resource control (RRC) layer in the device conveying QoS-flow-to-DRB/LCH mapping to the MAC layer;
  the SDAP layer informing the MAC layer of the QoS-flow-to-DRB/LCH mapping for a QOS;
  a QoS flow identifier (QFI) field in an LCH configuration information element;
  a logical channel prioritization (LCP) restriction; or
  a QFI parameter in a configured grant (CG) configuration information element.

17. The method of claim 1, further comprising the SDAP layer:
  relaying the indication to the MAC layer when the indication is by the SDAP layer, wherein the indication corresponds to a given quality of service (QOS) flow and is based on one or more of:
    jitter and/or variation of packet arrival times;
    variation of packet size distribution;
    unexpected variation of otherwise regular packet sizes;
    unexpected variation of buffer status for SDAP input buffers for uplink communication; or
    variation of packet residency times for the SDAP input buffers for uplink communications.

18. A device comprising:
  radio circuitry configured to enable wireless communications of the device; and
  a processor communicatively coupled to the radio circuitry and configured to interoperate with the radio circuitry to:
    cause an application layer in the device or by a service data adaptation protocol (SDAP) layer in the device or by a media access control (MAC) layer in the device to provide an indication that wireless communication resources allocated to the device need to be adjusted;
    transmit, in a MAC Control Element (MAC CE) to a base station in response to the indication, a request for an adjustment of the wireless communication resources by the base station, wherein the request comprises at least a delay indication based on a length of time data has remained in a transmission buffer of the device;
    cause the application layer and/or the SDAP layer to request lower relative layers for a temporary boost of resources in response to the indication; and
    transmit the MAC CE at least partially in response to the application layer and/or the SDAP layer requesting the temporary boost of resources.

19. A non-transitory memory element storing data and/or instructions executable by a processor to:
  cause an application layer in the device or a service data adaptation protocol (SDAP) layer in the device or a media access control (MAC) layer in the device to provide an indication that wireless communication resources allocated to the device need to be adjusted;
  cause transmission, in a MAC Control Element (MAC CE) from the device to a base station in response to the indication, of a request for an adjustment of the wireless communication resources by the base station, wherein the request comprises at least a delay indication based on a length of time data has remained in a transmission buffer of the device;
  cause the application layer and/or the SDAP layer to request lower relative layers for a temporary boost of resources in response to the indication; and
  transmit the MAC CE at least partially in response to the application layer and/or the SDAP layer requesting the temporary boost of resources.

* * * * *

UNITED STATES PATENT AND TRADEMARK OFFICE
CERTIFICATE OF CORRECTION

PATENT NO. : 12,273,882 B2
APPLICATION NO. : 17/438214
DATED : April 8, 2025
INVENTOR(S) : Ralf Rossbach et al.

Page 1 of 1

It is certified that error appears in the above-identified patent and that said Letters Patent is hereby corrected as shown below:

In the Claims

Column 27, Line 49, delete "An;" and insert --A--.
Column 28, Line 21, delete "QOS" and insert --QoS--.
Column 28, Line 25, delete "is".
Column 29, Line 44, delete "QOS" and insert --QoS--.
Column 30, Line 19, delete "by".
Column 30, Line 21, delete "by".
Column 30, Line 27, delete "an".
Column 30, Line 47, delete "an".

Signed and Sealed this
Third Day of June, 2025

Coke Morgan Stewart
*Acting Director of the United States Patent and Trademark Office*